United States Patent [19]

Alfredo

[11] Patent Number: 5,192,573
[45] Date of Patent: Mar. 9, 1993

[54] METHOD FOR MAKING A FLAVORING COMPOSITION

[76] Inventor: Cirello Alfredo, Via Arona, 16, 20145 Milano, Italy

[21] Appl. No.: 764,138

[22] Filed: Sep. 20, 1991

[30] Foreign Application Priority Data

Sep. 21, 1990 [IT] Italy ............................ 21537 A/90

[51] Int. Cl.⁵ ............................................. A23L 1/226
[52] U.S. Cl. .................................. 426/533; 426/580; 426/650
[58] Field of Search ..................... 426/533, 580, 650

[56] References Cited

U.S. PATENT DOCUMENTS 4,592,913  6/1986  Hara ...................................... 426/104

*Primary Examiner*—Joseph Golian
*Attorney, Agent, or Firm*—Bucknam and Archer

[57] ABSTRACT

In a method for making a flavoring composition, in particular a composition having a truffle flavor, as a natural base or precursor material for the composition, natural casein is used.

3 Claims, No Drawings

METHOD FOR MAKING A FLAVORING COMPOSITION

BACKGROUND OF THE INVENTION

The present invention relates to a method for semi-synthetically making a flavoring composition, in particular a composition having a truffle flavor.

As is known, truffles are underground mushrooms which are very appreciated in gastronomy owing to their good flavoring characteristics; in particular truffles being very valued on the food market and because of their rareness and of the very difficult search therefor, they are very expensive.

Thus, a replacement composition adapted to provide a natural flavor of truffle to food materials would be very useful from the commercial and economic standpoint.

Several methods are already known for providing replacement composition of the natural truffle flavor; for example it is possible to use single pure components which constitute the natural flavor, but this method is not satisfactory from a practical standpoint because of the difficulties of finding the precise nature and ratio of the individual components of the natural truffle flavor.

Another known method is that of using the so-called precursor natural elements which, as they are subjected to a suitable chemical reaction, such as the well known Maillard reaction, provide products having flavor characteristics substantially similar to those of natural truffles.

The products made by the latter method, however, have not be found to be satisfactory from a qualitative, time stability and economic standpoint.

SUMMARY OF THE INVENTION

Accordingly, the main object of the present invention is to provide a method for making semi-synthetically a composition having a flavor adapted to satisfactorily replace the flavor of the natural truffles.

Another object of the present invention is to provide such a composition which is very stable in storing conditions and which can be directly used in food products and the like.

Yet another object of the present invention is to provide such a method which is very advantageous from a mere economic standpoint.

According to one aspect of the present invention, the above mentioned objects, as well as yet other objects, which will become more apparent hereinafter, are achieved by a method for making a flavoring composition having the features of the characterizing portion of the main claim.

As a natural precursor the method of the present invention uses casein, which, as is known, is an easily available natural protein of low commercial value.

The claimed method essentially comprises the step of causing casein to chemically react with 37% hydrochloric acid and 95° ethyl alcohol.

The reaction is carried out under heating, by refluxing the reaction vapors for a time sufficient to provide in the reaction mixture a stable temperature of 100°–110° C., preferably of 102.5° C.

At the end of the reaction the mixture is neutralized by an alkaline substance, such as sodium carbonate, to a pH of 6–7, preferably to a pH of 6.2.

Then the mixture is accurately filtered and the clear obtained liquid is concentrated to about 20° Bé; preferably the concentrating step being carried out under a reduced pressure.

The thus concentrated mixture is further filtered and the clear obtained liquid is concentrated preferably under a reduced pressure to the desired consistency for the end use, for example either to a paste form or to a liquid form.

The dose of the composition according to the invention to be used will depend on the required appliction.

For example for an use in "risotti" or "pasta" the dose will correspond to a knife tip dose.

In order to prepare a truffle flavor butter, the composition according to the present invention can be used with a rate of 1–7%.

The invention will be better understood from the following Examples which are provided by way of illustration and must not be considered as limitative of the scope of the invention.

EXAMPLE 1

Into a flask provided with stirrer, thermometer and cooling reflux device there are introduced 150 g of casein, 200 g of 37% hydrochloric acid and 60 ml 95° ethanol.

The mixture is gradually heated in about 15 hours to provide an inner temperature of 102.5° C. and then being left at this temperature for about 15 hours.

By controlling directly the mixture pH and the formed foam sodium carbonate is added so as to obtain a stable pH of 6.2.

The hot reaction mixture is then filtered and the clear obtained solution is concentrated under a reduced pressure and a temperature as low as possible to provide the mixture with a density of about 20° Bé.

Then the mixture salts are filtered out which are separated in a crystalized form.

The clear obtained liquid is concentrated under a reduced pressure and a temperature as low as possible to provide a semisolid paste.

Average weight yield based on casein: 155%

EXAMPLE 2 (flavorized butter)

96 g of butter are mixed at about 30° C. with 4 g of the composition made according to the method of Example 1. The thus obtained paste is packaged in a small jar, as is conventional. It is used depending on the specific requirements of the end user.

I claim:

1. A method for making a truffle flavour composition comprising the steps of providing natural casein as a precursor material of said composition, adding to said casein 37% hydrochloric acid and 95% by volume ethyl alcohol to provide a reaction mixture, heating said reaction mixture to cause said reaction mixture to provide reaction vapors, refluxing said reaction vapors for a time sufficient to bring said reaction mixture to a stable temperature of 102.5° C., neutralizing said reaction mixture with sodium carbonate to a pH value of 6.2, filtering said reaction mixture to provide a concentrated mixture and a first clear liquid, concentrating said first clear liquid to about 20 Bé, further filtering said concentrated mixture to provide a second clear liquid and concentrating said second clear liquid to provide an end truffle flavouring product.

2. A method according to claim 1, wherein said end truffle flavoring product is a paste product.

3. A method according to claim 1, wherein said end truffle flavoring product is a liquid product.

* * * * *